(12) United States Patent
Odate (10) Patent No.: US 12,535,341 B2
(45) Date of Patent: Jan. 27, 2026

(54) PROXIMITY SENSOR SYSTEM, STEERING DEVICE, AND FAULT DIAGNOSTIC METHOD FOR PROXIMITY SENSOR

(71) Applicant: HONDA MOTOR CO., LTD., Tokyo (JP)

(72) Inventor: Shotaro Odate, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 179 days.

(21) Appl. No.: 18/590,902

(22) Filed: Feb. 28, 2024

(65) Prior Publication Data

US 2024/0328833 A1    Oct. 3, 2024

(30) Foreign Application Priority Data

Mar. 27, 2023  (JP) ................................. 2023-050072

(51) Int. Cl.
*G01D 5/241* (2006.01)
*B62D 1/04* (2006.01)
(Continued)

(52) U.S. Cl.
CPC ............. *G01D 5/241* (2013.01); *B62D 1/046* (2013.01); *G01D 18/00* (2013.01); *G01R 27/2605* (2013.01)

(58) Field of Classification Search
CPC ........ G01R 27/00; G01R 27/02; G01R 27/26; G01R 27/2605; G01D 5/00; G01D 5/12; (Continued)

(56) References Cited

U.S. PATENT DOCUMENTS 11,650,694 B2 *  5/2023  Kakinoki .............. G06F 3/0362
                                                          345/174
2021/0034219 A1    2/2021  Anders
(Continued)

FOREIGN PATENT DOCUMENTS

EP          2930660 A1 * 10/2015  ......... G06K 7/10128
JP       H10142093 A     5/1998
(Continued)

OTHER PUBLICATIONS

Notification of Reasons for Refusal issued Oct. 1, 2024 in the JP Patent Application No. 2023-050072.

*Primary Examiner* — Hoai-An D. Nguyen
(74) *Attorney, Agent, or Firm* — CKC & Partners Co., LLC (57) ABSTRACT

A proximity sensor system includes: a plurality of proximity sensors 4 to 7; and a fault diagnostic device 8 that diagnoses the presence or absence of faults in the proximity sensors 4 to 7. Each of the proximity sensors 4 to 7 includes: an electrode 40 to 70; a power circuit 45 that applies voltage at an oscillation frequency to the electrodes; and a measuring circuit 46 that measures electrical characteristics of the electrodes. The fault diagnostic device 8 sets at least two of the proximity sensors as an oscillating target and a diagnostic target, acquires a result of measuring the electrical characteristics with the measuring circuit of the diagnostic target, while the power circuit of the oscillating target is generating electromagnetic waves at the oscillation frequency. The fault diagnostic device 8 diagnoses the presence or absence of faults in the diagnostic target, based on the result of measurement.

17 Claims, 6 Drawing Sheets

(51) Int. Cl.
   *G01D 18/00* (2006.01)
   *G01R 27/26* (2006.01)
(58) Field of Classification Search
   CPC ............ G01D 5/14; G01D 5/24; G01D 5/241;
                G01D 3/00; G01D 3/08; G01D 18/00;
                B62D 1/00; B62D 1/02; B62D 1/04;
         B62D 1/046; B62D 15/00; B62D 15/02;
         H03K 17/00; H03K 17/18; H03K 17/94;
                H03K 17/945; H03K 17/955; H03K
             2217/00; H03K 2217/94; H03K 2217/96;
             H03K 2217/9607; H03K 2217/960705
   USPC ................................ 324/600, 649, 658, 661
   See application file for complete search history.

(56) References Cited

U.S. PATENT DOCUMENTS

| | | |
|---|---|---|
| 2022/0270416 A1 | 8/2022 | Odate et al. |
| 2022/0316925 A1 | 10/2022 | Yoshida et al. |

FOREIGN PATENT DOCUMENTS

| | | | | |
|---|---|---|---|---|
| JP | 2008083025 A | * | 4/2008 | ............. G01N 27/22 |
| JP | 2022129139 A | | 9/2022 | |

* cited by examiner

| | \multicolumn{8}{c|}{TURN NUMBER N} |
|---|---|---|---|---|---|---|---|---|
| | 1 | 2 | 3 | 4 | 5 | 6 | 7 | ... |
| UPPER RIGHT PROXIMITY SENSOR | OSCILLATING TARGET | DIAGNOSTIC TARGET | DIAGNOSTIC TARGET | DIAGNOSTIC TARGET | OSCILLATING TARGET | DIAGNOSTIC TARGET | DIAGNOSTIC TARGET | ... |
| UPPER LEFT PROXIMITY SENSOR | DIAGNOSTIC TARGET | OSCILLATING TARGET | DIAGNOSTIC TARGET | DIAGNOSTIC TARGET | DIAGNOSTIC TARGET | OSCILLATING TARGET | DIAGNOSTIC TARGET | ... |
| LOWER RIGHT PROXIMITY SENSOR | DIAGNOSTIC TARGET | DIAGNOSTIC TARGET | OSCILLATING TARGET | DIAGNOSTIC TARGET | DIAGNOSTIC TARGET | DIAGNOSTIC TARGET | OSCILLATING TARGET | ... |
| LOWER LEFT PROXIMITY SENSOR | DIAGNOSTIC TARGET | DIAGNOSTIC TARGET | DIAGNOSTIC TARGET | OSCILLATING TARGET | DIAGNOSTIC TARGET | DIAGNOSTIC TARGET | DIAGNOSTIC TARGET | ... |

PROXIMITY SENSOR SYSTEM, STEERING DEVICE, AND FAULT DIAGNOSTIC METHOD FOR PROXIMITY SENSOR

This application is based on and claims the benefit of priority from Japanese Patent Application No. 2023-050072, filed on 27 Mar. 2023, the content of which is incorporated herein by reference.

BACKGROUND OF THE INVENTION

Field of the Invention

The present invention relates to a proximity sensor system, a steering device, and a fault diagnostic method for proximity sensors. More specifically, the present invention relates to a proximity sensor system, a steering device, and a fault diagnostic method, with which the presence or absence of faults in a plurality of proximity sensors is determined.

Related Art

In recent years, there has been an active effort to provide access to sustainable transportation systems that consider the needs of vulnerable road users. Towards this goal, research and development efforts are focused on enhancing traffic safety and convenience through the development of driver assistance technologies that support the driver's awareness of their surroundings.

Japanese Unexamined Patent Application, Publication No. 2022-129139 discloses a touch detection device that uses a capacitive sensor installed on the steering wheel to determine whether the driver is gripping the steering wheel. Japanese Unexamined Patent Application, Publication No. 2022-129139 also discloses a technology related to a fault diagnostic method for touch detection devices using capacitive sensors. More specifically, the fault diagnostic method disclosed in Japanese Unexamined Patent Application, Publication No. 2022-129139 uses an estimation means to estimate whether the human body is in contact with the steering wheel, and diagnoses faults related to the capacitive sensor, based on a result of detection by the capacitive sensor when the estimation means estimates there is contact, and another result of detection by the capacitive sensor when the estimation means estimates there is no contact.

Patent Document 1: Japanese Unexamined Patent Application, Publication No. 2022-129139

SUMMARY OF THE INVENTION

However, the fault diagnostic method disclosed in Japanese Unexamined Patent Application, Publication No. 2022-129139 requires using an estimation means other than the touch detection device to determine whether the human body is in contact with the steering wheel, which may lead to increased processing loads and costs.

The present invention aims to provide a proximity sensor system, a steering device, and a fault diagnostic method, which can diagnose the presence or absence of faults in proximity sensors with a relatively simple configuration, and to ultimately contribute to the development of sustainable transportation systems.

(1) A proximity sensor system (e.g., proximity sensor system S described later) according to the present invention is characterized by including: a plurality of proximity sensors (e.g., proximity sensors 4 to 7 described later) that detect proximity of a target object (e.g., human body H described later) to a target structure (e.g., steering wheel 2 described later); and a fault diagnostic device (e.g., fault diagnostic device 8 described later) that diagnoses presence or absence of faults in the proximity sensors. Each of the plurality of proximity sensors includes: an electrode (e.g., upper right electrode 40 described later) provided at each different position of the target structure; a power circuit (e.g., power circuit 45 described later) that applies voltage at an oscillation frequency to the electrode; and a measuring circuit (e.g., measuring circuit 46 described later) that measures electrical characteristics of the electrode. The fault diagnostic device sets at least two of the proximity sensors as an oscillating target and a diagnostic target, acquires a result of measuring the electrical characteristics with the measuring circuit of the diagnostic target, while the power circuit of the oscillating target is generating electromagnetic waves at the oscillation frequency. The fault diagnostic device diagnoses the presence or absence of faults in the diagnostic target, based on the result of measurement.

(2) In this case, while the oscillating target is generating electromagnetic waves, it is preferable for the fault diagnostic device to break connection between the electrode and the power circuit of the diagnostic target, and maintain the connection of the electrode and the measuring circuit of the diagnostic target.

(3) In this case, it is preferable for the fault diagnostic device to set the oscillating target from among the proximity sensors that detect proximity of the target object, and set the diagnostic target from among the proximity sensors that do not detect proximity of the target object.

(4) In this case, it is preferable for the fault diagnostic device to periodically switch the settings of the oscillating target and the diagnostic target at predetermined intervals.

(5) In this case, it is preferable for the measuring circuit to measure voltage of a capacitor (e.g., reference capacitor 461 described later) connected to the electrode via a switch (e.g., first switch 43 described later); and it is preferable for the fault diagnostic device to diagnose the presence or absence of faults in the diagnostic target, based on comparison of a frequency of voltage measured with the measuring circuit of the diagnostic target with the oscillation frequency of the power circuit of the oscillating target.

(6) In this case, it is preferable for the fault diagnostic device to diagnose the presence or absence of faults in the diagnostic target, based on comparison of a level of voltage measured by the diagnostic target with a predetermined reference level.

(7) In this case, it is preferable for the fault diagnostic device to diagnose the presence or absence of faults in the diagnostic target, based on a number of occurrences of pulse-shaped fluctuations in the voltage measured by the diagnostic target.

(8) In this case, it is preferable for the oscillation frequency to differ for each proximity sensor.

(9) The steering device (e.g., steering device 1 described later) according to the present invention is characterized by including a steering wheel (e.g., steering wheel 2 described later) that receives a steering operation from a driver; the proximity sensor system (e.g., proximity sensor system S described later) described above in any one of (1) to (4), provided on the steering wheel serving as the target structure; and a grip determination device (e.g., grip determination device 9 described later) that determines whether the steering wheel is gripped, based on a result of detection by the proximity sensors.

(10) The fault diagnostic method according to the present invention diagnoses presence or absence of faults in a plurality of proximity sensors (e.g., proximity sensors 4 to 7 described later) that detect proximity of a target object (e.g., human body H described later) to a target structure (e.g., steering wheel 2 described later). Each of the plurality of proximity sensors includes: an electrode (e.g., upper right electrode 40 described later) provided at each different position of the target structure; a power circuit (e.g., power circuit 45 described later) that applies voltage at an oscillation frequency to the electrode; and a measuring circuit (e.g., measuring circuit 46 described later) that measures electrical characteristics of the electrode. The method is characterized by including: a first step (e.g., Steps ST2, ST14, and ST15 described later) of setting at least two of the proximity sensors as an oscillating target and a diagnostic target; a second step (e.g., Steps ST3, ST4, ST16, and ST17 described later) of measuring electrical characteristics of the electrode with the measuring circuit of the diagnostic target, while the power circuit of the oscillating target is generating electromagnetic waves at the oscillation frequency; and a third step (e.g., Steps ST6 and ST19 described later) of diagnosing the presence or absence of faults in the diagnostic target, based on a result of measurement in the second step.

(1) The proximity sensor system according to the present invention includes: a plurality of proximity sensors that detect proximity of a target object to a target structure; and a fault diagnostic device that diagnoses the presence or absence of faults in the proximity sensors. Each proximity sensor includes: an electrode positioned at each different location on the target structure; a power circuit that applies voltage at an oscillation frequency to the electrode; and a measuring circuit that measures electrical characteristics of the electrode. The fault diagnostic device sets at least two of the plurality of proximity sensors as the oscillating target and the diagnostic target. The fault diagnostic device acquires a result of measurement of electrical characteristics with the measuring circuit of the diagnostic target while the power circuit of the oscillating target is generating electromagnetic waves at an oscillation frequency from the electrode, and diagnoses the presence or absence of faults in the diagnostic target, based on the result of measurement. When the power circuit of the oscillating target applies voltage at an oscillation frequency to the electrode, electromagnetic waves at the oscillation frequency are generated around the electrode. If there is no fault in the diagnostic target, the electrical characteristics of the electrode of the diagnostic target will change due to the antenna induction effect between the oscillating target and the diagnostic target. Therefore, the presence or absence of faults in the diagnostic target correlates with the result of measurement with the measuring circuit of the diagnostic target. Thus, according to the present invention, the presence or absence of faults in the proximity sensors can be diagnosed by using at least two of the plurality of proximity sensors provided on the same target structure, allowing for diagnosing faults in the proximity sensors with a relatively simple configuration, ultimately contributing to the development of sustainable transportation systems.

(2) In the present invention, while the oscillating target is generating electromagnetic waves, the fault diagnostic device breaks connection between the electrode and the power circuit of the diagnostic target, and maintains the connection between the electrode and the measuring circuit of the diagnostic target. Therefore, the present invention can prevent fluctuation of the electrical characteristics of the electrode of the diagnostic target due to the influence of the voltage applied from the power circuit of the diagnostic target, thus the presence or absence of faults in the diagnostic target can be diagnosed more accurately.

(3) With the proximity sensors as described above, the power circuit needs to apply voltage to the electrode as appropriate in order to detect whether the target object is in proximity to the target structure. In contrast, in order to accurately diagnose the presence or absence of faults, it is preferable for the proximity sensors set as the diagnostic targets to keep the disconnection of the electrode and the power circuit. In other words, while the proximity sensors are set as the diagnostic targets, the proximity sensors cannot detect the presence or absence of proximity of the target object. Therefore, the fault diagnostic device according to the present invention sets the oscillating target from among the proximity sensors that detect proximity of the target object, and sets the diagnostic target from among the proximity sensors that do not detect proximity of the target object. As a result, the presence or absence of faults in the proximity sensors set as the diagnostic targets can be diagnosed simultaneously while the proximity sensor as the oscillating target keeps detecting the presence or absence of proximity of the target object.

(4) In the present invention, the fault diagnostic device switches the settings of the oscillating target and the diagnostic targets at a predetermined interval. Therefore, according to the present invention, even when a multitude of proximity sensors are provided on the target structure, the presence or absence of faults in all of the proximity sensors can be periodically diagnosed.

(5) As described above, when the power circuit of the oscillating target applies voltage at an oscillation frequency to the electrode, electromagnetic waves at the oscillation frequency are generated around the electrode. If there is no fault in the diagnostic target, the voltage of the capacitor connected to the electrode of the diagnostic target will fluctuate at the same frequency as the oscillation frequency of the oscillating target, due to the antenna induction effect between the oscillating target and the diagnostic target. Therefore, the fault diagnostic device diagnoses the presence or absence of faults in the diagnostic target, based on comparison of the frequency of the voltage of the capacitor measured with the measuring circuit of the diagnostic target with the oscillation frequency of the power circuit of the oscillating target. This allows for highly accurately diagnosing the presence or absence of faults in the diagnostic target. According to the present invention, by comparing frequencies, not only can the presence or absence of faults be determined, but also the nature of the fault (such as an open-circuit fault) can be identified.

(6) Due to the antenna induction effect between the oscillating target and the diagnostic target, the level of the voltage of the capacitor connected to the electrode of the diagnostic target varies, based on the positional relationship between the electrode of the oscillating target and the electrode of the diagnostic target. Therefore, the fault diagnostic device diagnoses the presence or absence of faults in the diagnostic target by comparing the level of the voltage measured with the measuring circuit of the diagnostic target with a predetermined reference level, allowing for more accurately diagnosing the presence or absence of faults in the diagnostic target. According to the present invention, by comparing levels, not only can the presence or absence of faults be determined, but also the nature of the fault (such as a short-circuit fault) can be identified.

(7) The fault diagnostic device diagnoses the presence or absence of faults in the diagnostic target, based on a number of occurrences of pulse-like fluctuations in the voltage measured with the measuring circuit of the diagnostic target. This allows for diagnosing the presence or absence of chattering faults in the diagnostic target.

(8) In the present invention, by setting different oscillation frequencies for each proximity sensor, the frequency of electromagnetic waves generated by the electrode of the oscillating target can be varied for each proximity sensor. Therefore, the present invention allows for even more accurately diagnosing the presence or absence of faults in the diagnostic targets.

(9) The steering device according to the present invention includes: a steering wheel; a proximity sensor system provided on the steering wheel; and a grip determination device that determines whether the steering wheel is gripped, based on a result of detection by the plurality of proximity sensors. Therefore, according to the present invention, while the driver is operating a vehicle equipped with the steering device, and the grip determination device determines whether the driver is gripping the steering wheel, the fault diagnostic device can diagnose the presence or absence of faults in the plurality of proximity sensors. This allows for diagnosing the presence or absence of faults in the proximity sensors provided on the steering wheel with a relatively simple configuration, contributing to the development of a sustainable transportation system.

(10) The fault diagnostic method according to the present invention involves setting at least two of the plurality of proximity sensors as the oscillating target and the diagnostic target, measuring electrical characteristics of the electrode with the measuring circuit of the diagnostic target, while the power circuit of the oscillating target is generating electromagnetic waves at the oscillation frequency, and diagnosing the presence or absence of faults in the diagnostic target, based on the result of measuring the electrical characteristics. Therefore, according to the present invention, the presence or absence of faults can be diagnosed by using at least two of the plurality of proximity sensors provided on the same target structure, allowing for diagnosing the presence or absence of faults in the proximity sensors with a relatively simple configuration, and thus contributing to the development of sustainable transportation systems.

DETAILED DESCRIPTION OF THE INVENTION

First Embodiment

The following describes the proximity sensor system, the steering device, and the fault diagnostic method according to the first embodiment of the present invention, with reference to the drawings.

Figure 1:
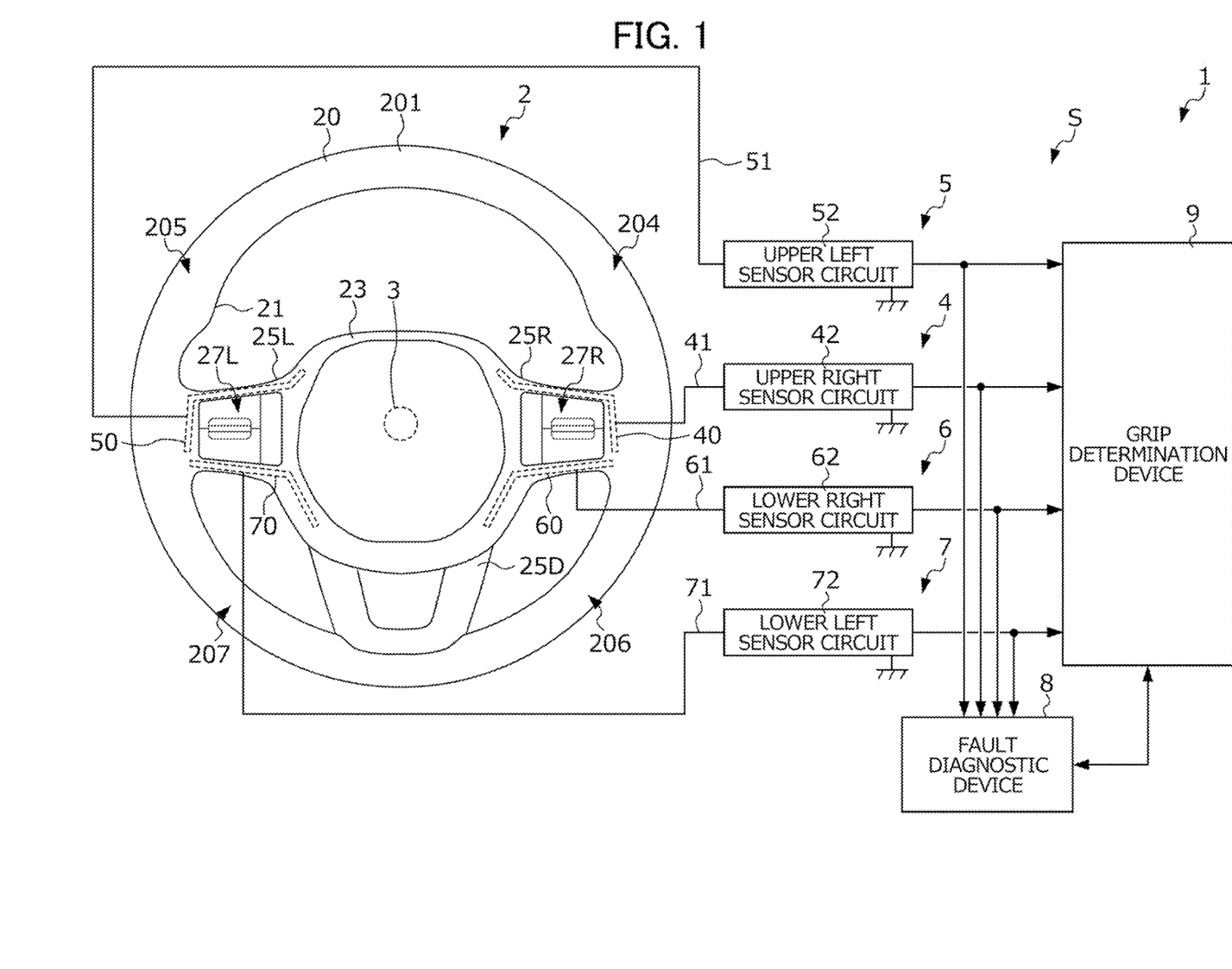
FIG. 1 is a diagram illustrating the configuration of the proximity sensor system and the steering device according to the first embodiment of the present invention.

FIG. 1 illustrates a diagram of the configuration of the proximity sensor system S and the steering device 1 that includes the proximity sensor system S as a component, according to the present embodiment. The steering device 1 is mounted on a vehicle (not illustrated).

The steering device 1 includes: a steering wheel 2 that receives the driver's vehicle steering operations and vehicle accessory operations; a steering shaft 3 that supports the steering wheel 2; a proximity sensor system S that is provided on the steering wheel 2 as the target structure and detects proximity of an object (e.g., the driver's hand) to the steering wheel 2; and a grip determination device 9 that determines whether the driver is gripping the steering wheel 2, based on the result of detection by the proximity sensor system S.

The steering wheel 2 includes: a circular rim 20 that can be gripped by the driver; a hub 23 provided to the inner side of the rim 20; and three spokes 25L, 25R, 25D extending radially from the hub 23 and connected to the rim inner periphery 21 of the rim 20.

The hub 23 is disc-shaped, positioned, for example, at the center of the rim 20 as seen from the driver, and configures the center of the steering wheel 2. The steering shaft 3 that supports the steering wheel 2 is connected to the back side of the hub 23 as seen from the driver. The steering shaft 3 is an axial connecting member that connects the core bar of the hub 23 to the steering mechanism that configures part of the vehicle body (not illustrated). Therefore, the steering torque generated by rotation of the steering wheel 2 by the driver is transmitted via the steering shaft 3 to the steering mechanism (not illustrated).

The rim 20 is connected to the hub 23 via the three spokes 25L, 25R, and 25D. The left spoke 25L extends horizontally, and connects the left part of the hub 23 as seen from the driver to the left part of the rim inner periphery 21 as seen from the driver. The right spoke 25R extends parallel with the left spoke 25L and along the horizontal direction, and connects the right part of the hub 23 as seen from the driver to the right part of the rim inner periphery 21 as seen from the driver. The bottom spoke 25D extends orthogonal to the spokes 25L, 25R and along the vertical direction, and connects the bottom part of the hub 23 as seen from the driver to the bottom part of the rim inner periphery 21 as seen from the driver.

As described above, the rim 20 is circular as seen from the driver, and the driver can grip all circumference of the rim 20.

The left spoke 25L and the right spoke 25R are provided with a left accessory operation console unit 27L and a right accessory operation console unit 27R, respectively, which receive the driver's operations for the vehicle accessories (not illustrated; e.g., audio systems, car navigation devices, etc.). The driver can operate the vehicle accessories by operating a plurality of switches provided on these accessory operation console units 27L, 27R with the fingers.

Hereinafter, the positions of the rim 20, the rim inner periphery 21, the hub 23, and the steering shaft 3 which are approximately circular as seen from the driver, as well as the orientations of the spokes 25L, 25R, 25D may be expressed in degrees [°] in a clockwise direction centered around the steering shaft 3, taking the upper end 201 of the rim 20 as seen from the driver as the reference. That is, the right spoke 25R extends along the direction of 90°, and connects the hub 23 and the rim inner periphery 21 over the area of 90°. The bottom spoke 25D extends along the direction of 180°, and connects the hub 23 and the rim inner periphery 21 over the area of 180°. The left spoke 25L extends along the direction of 270°, and connects the hub 23 and the rim inner periphery 21 over the area of 270°.

The proximity sensor unit S includes a plurality of (four in the present embodiment) proximity sensors 4, 5, 6, 7 that detect proximity of the driver's hands to the steering wheel 2, and a fault diagnostic device 8 that diagnoses the presence or absence of faults in the proximity sensors 4 to 7. As will be described below, the proximity sensors 4 to 7 include electrodes 40, 50, 60, 70, respectively, which are positioned at different locations on the steering wheel 2. Therefore, the proximity sensors 4 to 7 cover different detection target regions for detecting proximity of the driver's hands to the steering wheel 2.

The upper right proximity sensor 4 includes: an upper right electrode 40 provided on the steering wheel 2; and an upper right sensor circuit 42 electrically connected to the upper right electrode 40. The upper right electrode 40 is positioned on the right spoke 25R of the steering wheel 2, above the right accessory operation console unit 27R as seen from the driver. The upper right electrode 40 is made of a plate-like conductive material and is located on the right spoke 25R so as to face the area between 0° to 90° of the rim 20 (referred to as "upper right grip 204"). The upper right sensor circuit 42 is connected to the upper right electrode 40 via wiring 41. The upper right sensor circuit 42 has a function of measuring the capacitance between the upper right electrode 40 and the ground, which is a value varying depending on the distance between the position of the upper right electrode 40 and the human body. The capacitance between the upper right electrode 40 and the ground increases as the distance between the position of the upper right electrode 40 and the human body decreases. The upper right sensor circuit 42 transmits the result of measuring the capacitance to the grip determination device 9.

The upper left proximity sensor 5 includes: an upper left electrode 50 provided on the steering wheel 2; and an upper left sensor circuit 52 electrically connected to the upper left electrode 50. The upper left electrode 50 is positioned on the left spoke 23L of the steering wheel 2, above the left accessory operation console unit 27L as seen from the driver. The upper left electrode 50 is made of a plate-like conductive material and is located on the left spoke 25L so as to face the area between 270° to 360° of the rim 20 (hereafter referred to as "upper left grip 205"). The upper left sensor circuit 52 is connected to the upper left electrode 50 via wiring 51. The upper left sensor circuit 52 has a function of measuring the capacitance between the upper left electrode 50 and the ground, which is a value varying depending on the distance between the position of the upper left electrode 50 and the human body. The capacitance between the upper left electrode 50 and the ground increases as the distance between the position of the upper left electrode 50 and the human body decreases. The upper left sensor circuit 52 transmits the result of measuring the capacitance to the grip determination device 9.

The lower right proximity sensor 6 includes: a lower right electrode 60 provided on the steering wheel 2; and a lower right sensor circuit 62 electrically connected to the lower right electrode 60. The lower right electrode 60 is located on the right spoke 25R of the steering wheel 2, below the right accessory operation console unit 27R as seen from the driver. The lower right electrode 60 is made of a plate-like conductive material and is located on the right spoke 25R so as to face the area between 90° to 180° of the rim 20 (hereafter referred to as "lower right grip 206"). The lower right sensor circuit 62 is connected to the lower right electrode 60 via wiring 61. The lower right sensor circuit 62 has a function of measuring the capacitance between the lower right electrode 60 and the ground, which is a value varying depending on the distance between the position of the lower right electrode 60 and the human body. The capacitance between the lower right electrode 60 and the ground increases as the distance between the position of the lower right electrode 60 and the human body decreases. The lower right sensor circuit 62 transmits the result of measuring the capacitance to the grip determination device 9.

The lower left proximity sensor 7 includes: a lower left electrode 70 provided on the steering wheel 2; and a lower left sensor circuit 72 electrically connected to the lower left electrode 70. The lower left electrode 70 is located on the left spoke 25L of the steering wheel 2, below the left accessory operation console unit 27L as seen from the driver. The lower left electrode 70 is made of a plate-like conductive material and is located on the left spoke 25L so as to face the area between 180° to 270° of the rim 20 (hereafter referred to as "lower left grip 207"). The lower left sensor circuit 72 is connected to the lower left electrode 70 via wiring 71. The lower left sensor circuit 72 has a function of measuring the capacitance between the lower left electrode 70 and the ground, which is a value varying depending on the distance between the position of the lower left electrode 70 and the human body. The capacitance between the lower left electrode 70 and the ground increases as the distance between the position of the lower left electrode 70 and the human body decreases. The lower left sensor circuit 72 transmits the result of measuring the capacitance to the grip determination device 9.

As described above, the electrodes 40, 50, 60, 70 of the proximity sensors 4, 5, 6, 7 are positioned at different locations on the steering wheel 2. Therefore, the proximity sensors 4, 5, 6, 7 cover different detection target regions on the steering wheel 2. More specifically, in particular, the upper right grip 204 of the steering wheel 2 is the detection target region for the upper right proximity sensor 4 that detects proximity of the driver's hand to this detection target region. In particular, the upper left grip 205 of the steering wheel 2 is the detection target region for the upper left proximity sensor 5 that detects proximity of the driver's hand to this detection target region. In particular, the lower right grip 206 of the steering wheel 2 is the detection target region for the lower right proximity sensor 6 that detects proximity of the driver's hand to this detection target region. In particular, the lower left grip 207 of the steering wheel 2 is the detection target region for the lower left proximity sensor 7 that detects proximity of the driver's hand to this detection target region.

Figure 2:
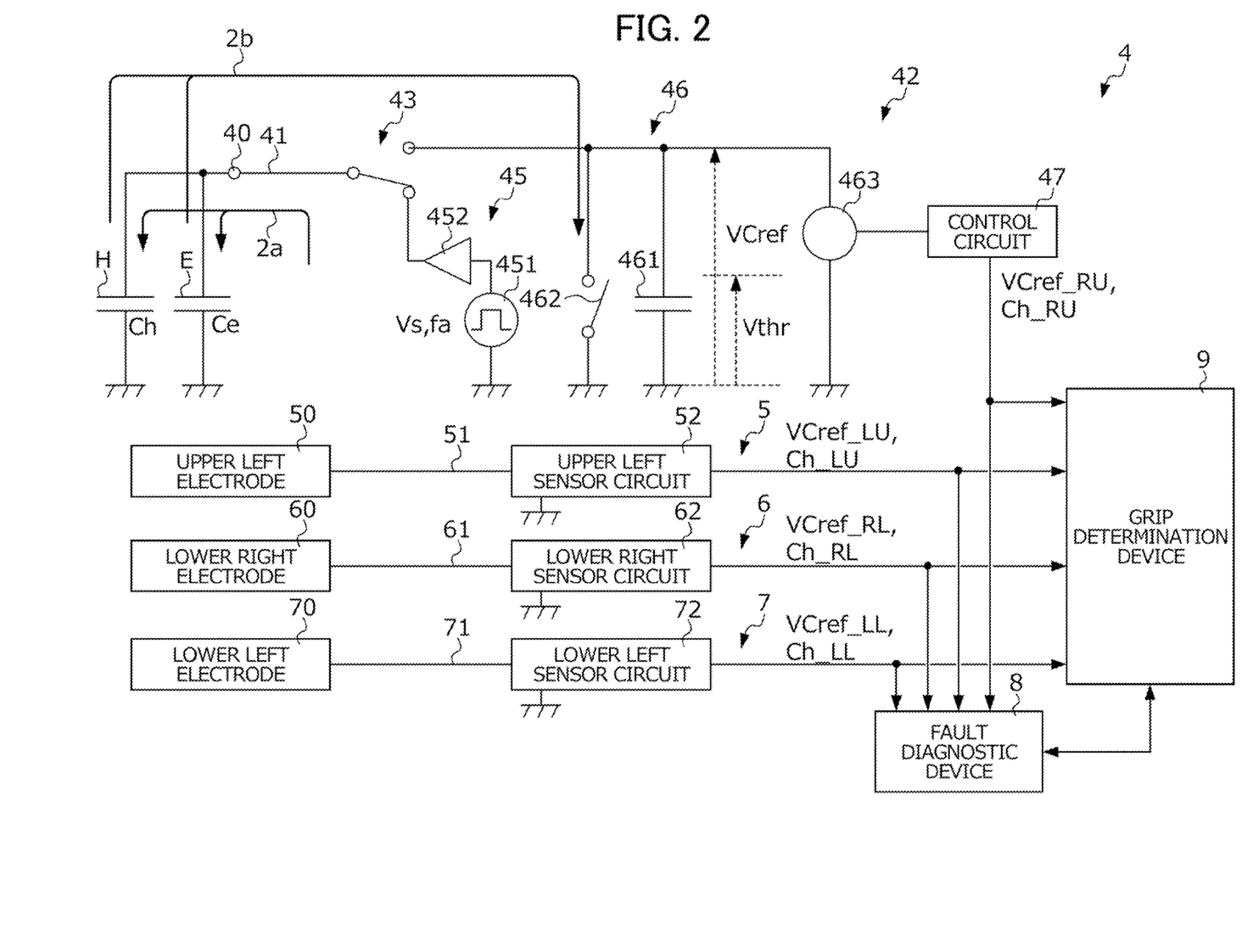
FIG. 2 is a diagram illustrating the circuit configuration of the right sensor circuit.

FIG. 2 is a diagram illustrating the circuit configuration of the upper right sensor circuit 42.

The upper right sensor circuit 42 includes: a first switch 43 connected to the upper right electrode 40 via the wiring 41; a power circuit 45 connected to the upper right electrode 40 via the wiring 41 and the first switch 43; a measuring circuit 46 connected to the upper right electrode 40 via the wiring 41 and the first switch 43; and a control circuit 47 that controls the first switch 43, the power circuit 45, and the measuring circuit 46. In FIG. 2, the capacitance between the upper right electrode 40 and the ground (e.g., the vehicle body) is illustrated as divided into the capacitance Ch formed by the human body H including the hands of the driver operating the steering wheel 2, and the floating capacitance Ce formed by the floating capacitors E such as wiring and components excluding the human body H.

The first switch 43 is a switching element that is turned on/off in response to commands from the control circuit 47. When turned on, the first switch 43 connects the upper right electrode 40 to the power circuit 45, and disconnects the upper right electrode 40 from the measuring circuit 46. When turned off, the first switch 43 connects the upper right electrode 40 to the measuring circuit 46, and disconnects the upper right electrode 40 from the power circuit 45. Thus, the first switch 43 selectively switches the upper right electrode 40 to be connected to the power circuit 45 or the measuring circuit 46, in response to commands from the control circuit 47.

The power circuit 45 includes a pulse power source 451 and an amplifier 452 connected in series to the upper right electrode 40 via the first switch 43, and uses these components to apply voltage of a predetermined oscillation frequency fa to the upper right electrode 40. The pulse power source 451 supplies a predetermined pulse voltage Vs of the oscillation frequency fa to the amplifier 452 in response to commands from the control circuit 47. The amplifier 452 amplifies the pulse voltage Vs of the oscillation frequency fa supplied from the pulse power source 451, and applies the amplified voltage to the upper right electrode 40 via the first switch 43.

The measuring circuit 46 includes a reference capacitor 461 connected to the upper right electrode 40 via the first switch 43, a second switch 462, and a voltage sensor 463, and uses these components to measure the electrical characteristics of the upper right electrode 40. The reference capacitor 461 is connected to the upper right electrode 40 via the first switch 43.

The second switch 462 is connected in parallel to the reference capacitor 461. The second switch 462 is a switching element that is turned on/off in response to commands from the control circuit 47. When turned on, the second switch 462 connects the high-voltage side of the reference capacitor 461 to the ground, discharging the charge stored in the reference capacitor 461. When turned off, the second switch 462 disconnects the high-voltage side of the reference capacitor 461 from the ground.

The voltage sensor 463 measures the voltage VCref of the reference capacitor 461 and transmits a signal corresponding to the measured value to the control circuit 47. Hereinafter, the measured value of voltage VCref obtained by the voltage sensor 463 of the upper right proximity sensor 4 is denoted as "VCref_RU".

The control circuit 47 controls the first switch 43, the power circuit 45, and the measuring circuit 46, under a control mode determined by commands from the fault diagnostic device 8 to be described later. The control circuit 47 is set with a plurality of control modes, such as a sensing mode in which the upper right proximity sensor 4 operates as a proximity sensor, and a receiving mode in which the upper right proximity sensor 4 operates as an antenna for receiving electromagnetic waves.

Under the sensing mode, the control circuit 47 operates the upper right proximity sensor 4 as a proximity sensor by controlling the first switch 43, the power circuit 45, and the measuring circuit 46, following the procedure below.

More specifically, under the sensing mode, the control circuit 47 keeps the second switch 462 off until the measured value VCref_RU of the voltage of the reference capacitor 461 reaches a pre-determined threshold value Vthr. Once the measured value VCref_RU of the voltage of the reference capacitor 461 reaches the threshold Vthr, the control circuit 47 turns the second switch 462 on, discharging the charge stored in the reference capacitor 461.

Under the sensing mode, the control circuit 47 turns the pulse power source 451 on, and switches the first switch 43 on/off at approximately the same frequency as the oscillation frequency fa, while the power circuit 45 is generating voltage of the oscillation frequency fa.

More specifically, the control circuit 47 turns the first switch 43 on in response to the rise of the pulse voltage Vs of the pulse power source 451, connects the upper right electrode 40 to the power circuit 45, and disconnects the upper right electrode 40 from the measuring circuit 46. As a result, the pulse voltage Vs is applied to the upper right electrode 40, and the charge moves along the path indicated by the arrow 2a in FIG. 2, charging the human body H and the floating capacitor E.

The control circuit 47 turns the first switch 43 off in response to the falling of the pulse voltage Vs of the pulse power source 451, connects the upper right electrode 40 to the measuring circuit 46, and disconnects the upper right electrode 40 from the power circuit 45. As a result, the human body H and the floating capacitor E are connected to the reference capacitor 461, the charge moves from the human body H and the floating capacitor E to the reference capacitor 461 along the path indicated by arrow 2b in FIG. 2, charging the reference capacitor 461. Consequently, the voltage VCref of the reference capacitor 461 increases.

When the power circuit 45 applies the pulse voltage of the oscillation frequency fa, the charging and discharging of the human body H and the floating capacitor E alternate, gradually increasing the voltage VCref of the reference capacitor 461. The time required for the voltage VCref of the reference capacitor 461 to reach the threshold Vthr (or the number of pulses from the pulse power source 461) varies depending on the capacitance Ch formed by the human body H, that is, the distance between the upper right electrode 40 and the driver's body. In other words, when a part of the driver's body is in proximity to the location of the upper right electrode 40 of the rim 20, the capacitance Ch will increase, and the time required for the voltage VCref of the reference capacitor 461 to reach the threshold Vthr will become shorter. Conversely, when a part of the driver's body is farther from the location of the upper right electrode 40, the capacitance Ch will decrease, and the time required for the voltage VCref of the reference capacitor 461 to reach the threshold Vthr will become longer.

Under the sensing mode, the control circuit 47 measures the time or the number of pulses required for the measured value VCref_RU of the voltage of the reference capacitor 461 to reach the threshold Vthr, then indirectly measures the capacitance Ch formed by the human body H near the upper right electrode 40, based on the measurement result, and sends a signal corresponding to the measured value to the grip determination device 9. Thus, the control circuit 47 detects proximity of the human body H to the detection target region of the upper right proximity sensor 4 through such measurement of the capacitance Ch. Hereinafter, the measured value of the capacitance Ch obtained by the control circuit 47 is denoted as "Ch_RU".

As such, under the sensing mode, the control circuit 47 connects the upper right electrode 40 to the power circuit 45, and applies voltage of the oscillation frequency fa to the upper right electrode 40. Therefore, while the upper right proximity sensor 4 is operating under the sensing mode, electromagnetic waves at the oscillation frequency fa are generated from the upper right electrode 40.

Under the receiving mode, the control circuit 47 keeps the first switch 43 and the second switch 462 off. That is, under the receiving mode, the control circuit 47 disconnects the upper right electrode 40 from the power circuit 45, and maintains the connection of the upper right electrode 40 and the measuring circuit 46. Under the receiving mode, while keeping the connection of the upper right electrode 40 and the measuring circuit 46, the control circuit 47 sends a signal corresponding to the result of measuring the electrical characteristics of the upper right electrode 40 with the measuring circuit 46, which is the measured value VCref_RU of the voltage of the reference capacitor 461, to the fault diagnostic device 8.

As such, under the receiving mode, the control circuit 47 keeps the upper right electrode 40 disconnected from the power circuit 45, thus, cannot detect proximity of the human body H to the upper right electrode 40.

The circuit configurations of the upper left sensor circuit 52, the lower right sensor circuit 62, and the lower left sensor circuit 72 are almost the same as the circuit configuration of the upper right sensor circuit 42, except for the oscillation frequencies of the pulse power sources. Therefore, detailed descriptions and illustrations of the circuit configurations of the upper left sensor circuit 52, the lower right sensor circuit 62, and the lower left sensor circuit 72 are omitted below.

Hereinafter, the oscillation frequency of the pulse power source of the upper left sensor circuit 52 is denoted as "fb", the oscillation frequency of the pulse power source of the lower right sensor circuit 62 is denoted as "fc", and the oscillation frequency of the pulse power source of the lower left sensor circuit 72 is denoted as "fd". Note that the following describes the case in which the oscillation frequencies fa, fb, fc, fd of the proximity sensors 4, 5, 6, 7 are different, but the present invention is not limited to this. The oscillation frequencies fa to fd can be the same for the proximity sensors 4 to 7. The oscillation frequencies fa to fd are set, for example, at several tens of kHz.

Hereinafter, the measured value of the voltage of the reference capacitor of the upper left sensor circuit 52 is denoted as "VCref_LU", the measured value of the voltage of the reference capacitor of the lower right sensor circuit 62 is denoted as "VCref_RL", and the measured value of the voltage of the reference capacitor of the lower left sensor circuit 72 is denoted as "VCref_LL".

Hereinafter, the measured value of the capacitance obtained by the control circuit of the upper left sensor circuit 52 is denoted as "Ch_LU", the measured value of the capacitance obtained by the control circuit of the lower right sensor circuit 62 is denoted as "Ch_RL", and the measured value of the capacitance obtained by the control circuit of the lower left sensor circuit 72 is denoted as "Ch_LL".

The upper left proximity sensor 5, the lower right proximity sensor 6, and the lower left proximity sensor 7, like the aforementioned upper right proximity sensor 4, can switch the control mode between the sensing mode and the receiving mode in response to commands from the fault diagnostic device 8.

The grip determination device 9 determines whether the driver is gripping the steering wheel 2, based on the result of detection by the proximity sensors 4 to 7, that is, based on the comparison of the capacitance measurement values Ch_RU, Ch_LU, Ch_RL, Ch_LL obtained by operating the proximity sensors 4 to 7 in the sensing mode, with the predetermined grip determination thresholds Ch_RU_th, Ch_LU_th, Ch_RL_th, Ch_LL_th, respectively.

More specifically, the grip determination device 9 determines that the steering wheel 2 is gripped in the upper right grip 204 if the measured value Ch_RU is greater than the grip determination threshold Ch_RU_th, and determines that the steering wheel 2 is not gripped in the upper right grip 204 if the measured value Ch_RU is equal to or less than the grip determination threshold Ch_RU_th.

The grip determination device 9 determines that the steering wheel 2 is gripped in the upper left grip 205 if the measured value Ch_LU is greater than the grip determination threshold Ch_LU_th, and determines that the steering wheel 2 is not gripped in the upper left grip 205 if the measured value Ch_LU is equal to or less than the grip determination threshold Ch_LU_th.

The grip determination device 9 determines that the steering wheel 2 is gripped in the lower right grip 206 if the measured value Ch_RL is greater than the grip determination threshold Ch_RL_th, and determines that the steering wheel 2 is not gripped in the lower right grip 206 if the measured value Ch_RL is equal to or less than the grip determination threshold Ch_RL_th.

The grip determination device 9 determines that the steering wheel 2 is gripped in the lower left grip 207 if the measured value Ch_LL is greater than the grip determination threshold Ch_LL_th, and determines that the steering wheel 2 is not gripped in the lower left grip 207 if the measured value Ch_LL is equal to or less than the grip determination threshold Ch_LL_th.

Note that when the fault diagnostic device 8 diagnoses any one of the proximity sensors 4 to 7 as out-of-order, the grip determination device 9 cancels the result of determination that is based on the result of detection by the proximity sensor diagnosed as out-of-order.

The fault diagnostic device 8 executes the fault diagnostic process to be described below with reference to FIG. 3, thereby diagnosing the presence or absence of faults in the proximity sensors 4 to 7 by.

Figure 3:
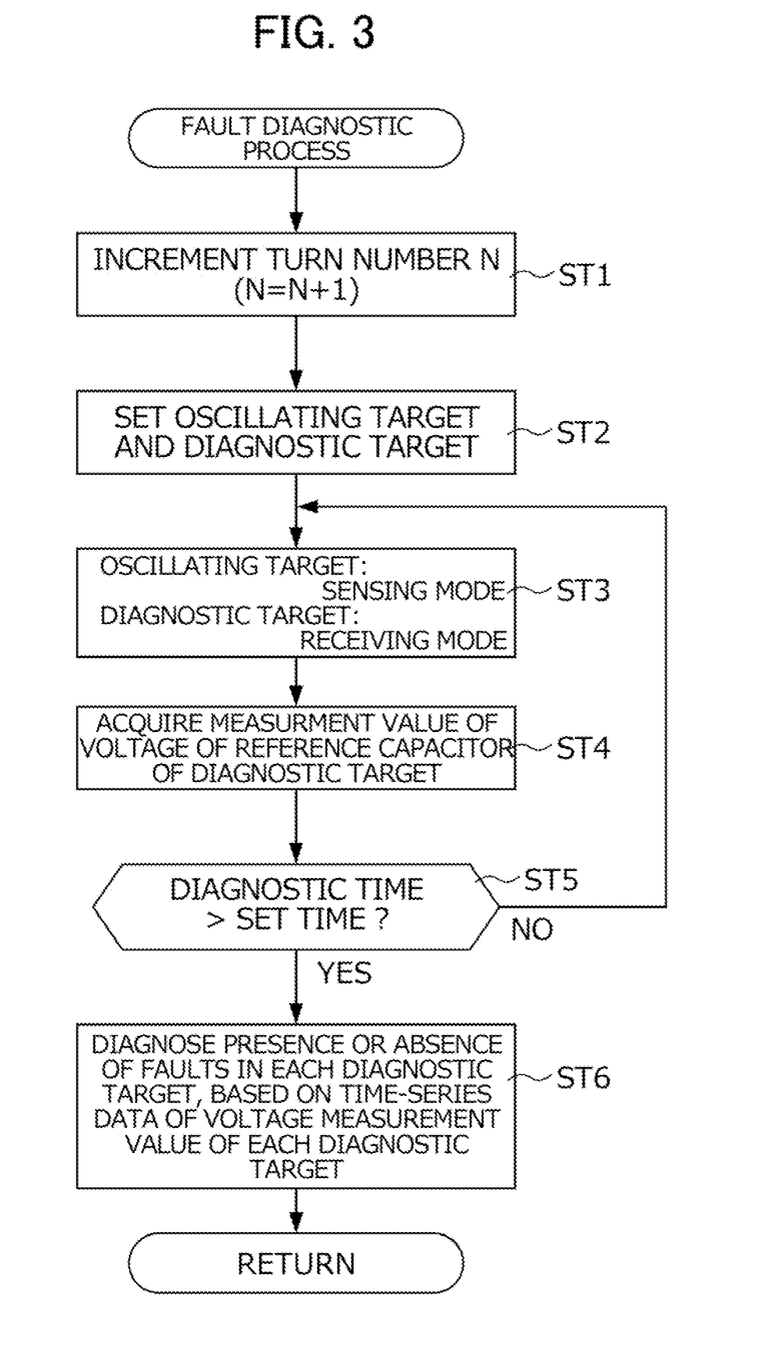
FIG. 3 is a flowchart illustrating the specific procedure of the fault diagnostic process.

FIG. 3 is a flowchart illustrating the specific procedure of the fault diagnostic process. The fault diagnostic device 8 repeatedly executes the fault diagnostic process illustrated in FIG. 3 in response to the startup of the vehicle equipped with the steering device 1.

Initially, in Step ST1, the fault diagnostic device 8 increments the turn number N, and proceeds to Step ST2. Here, the turn number N corresponds to the number of executions of the fault diagnostic process, which consists of the procedures described in Steps ST2 to ST6, and is initially set to 0.

Next, in Step ST2, the fault diagnostic device 8 sets at least two of the plurality of proximity sensors 4 to 7 as a new oscillating target and a new diagnostic target, and proceeds to Step ST3. Here, the following describes the case in which the fault diagnostic device 8 selects and sets one of the plurality of proximity sensors 4 to 7 as the oscillating target, and sets the rest of the plurality of proximity sensors 4 to 7, excluding the oscillating target, as the diagnostic target; however, the present invention is not limited to this. That is, at least one oscillating target and one diagnostic target may be set from among the plurality of proximity sensors 4 to 7, and the number of sensors thus set is arbitrary.

Figure 4:
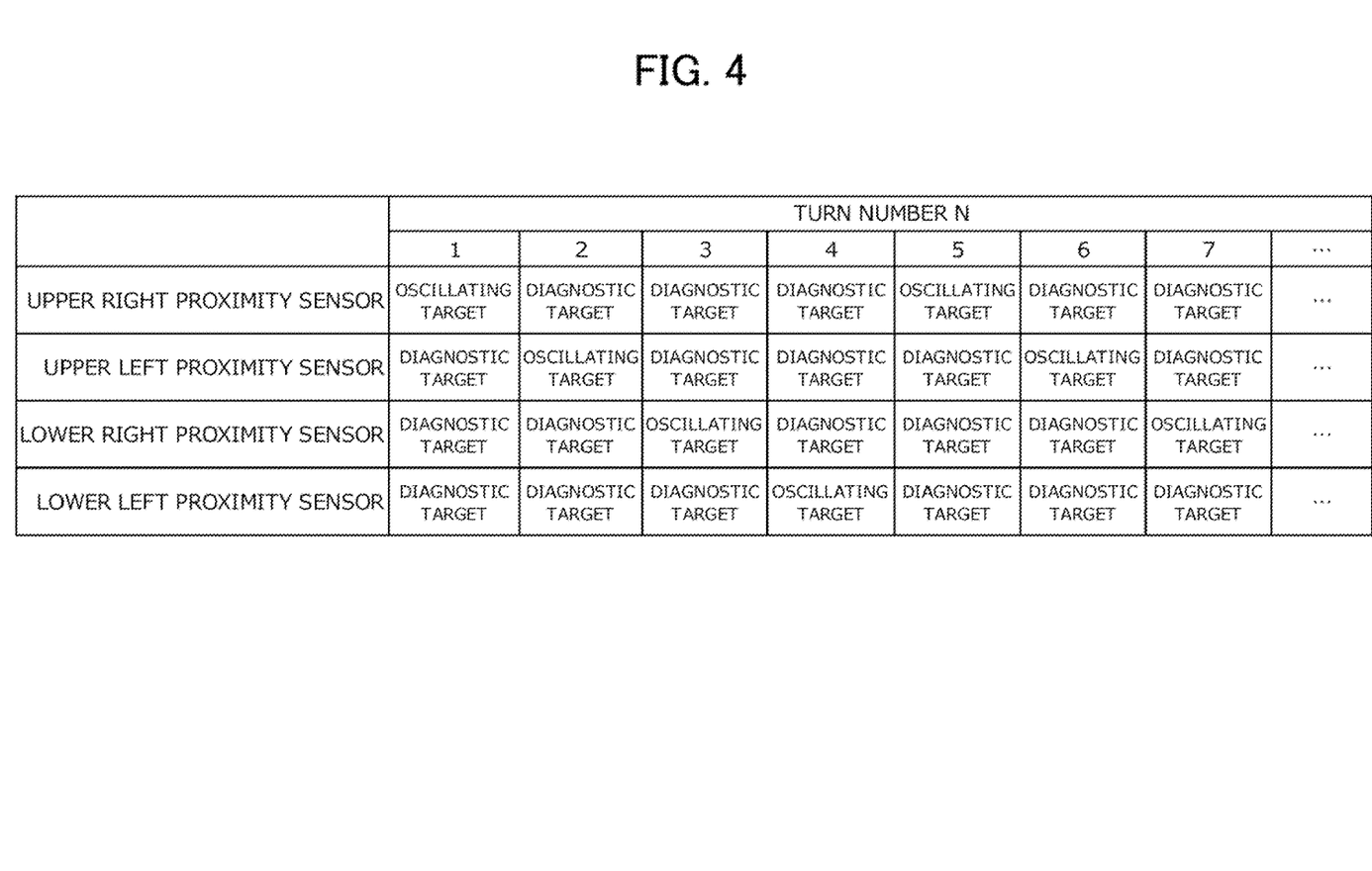
FIG. 4 is a diagram illustrating an example of a target setting table.

The present embodiment is described for the case in which the fault diagnostic device 8 sets the oscillating target and the diagnostic target by searching a target setting table as exemplified in FIG. 4, based on the turn number N.

With the target setting table as illustrated in FIG. 4, each time the turn number N is incremented, the oscillating target is cyclically set in order of the upper right proximity sensor 4, the upper left proximity sensor 5, the lower right proximity sensor 6, and the lower left proximity sensor 7. All the other proximity sensors 4 to 7 excluding the oscillating target are set as the diagnostic targets. Therefore, with the target setting table in FIG. 4, when the turn number N is "1", the upper right proximity sensor 4 is set as the oscillating target, and the upper left proximity sensor 5, the lower right proximity sensor 6, and the lower left proximity sensor 7 are set as the diagnostic targets.

Next, in Step ST3, the fault diagnostic device 8 sets the control mode of the proximity sensor, which was designated as the oscillating target in Step ST2, to the sensing mode, and sets the control mode of the other proximity sensors, which were designated as the diagnostic targets, to the receiving mode, and proceeds to Step ST4. By setting the control mode of the oscillating target to the sensing mode, electromagnetic waves at the oscillation frequency can be generated from the electrode of the oscillating target, while utilizing the oscillating target as a proximity sensor. By setting the control mode of the diagnostic targets to the receiving mode, the diagnostic targets can function as antennas and receive the electromagnetic waves emitted from the oscillating target.

In Step ST4, the fault diagnostic device 8 acquires the measurement result from the measuring circuits of the diagnostic targets, namely the measurement values of the voltage of the reference capacitors of the diagnostic targets (hereinafter referred to as "voltage measurement value"), and proceeds to Step ST5.

In Step ST5, the fault diagnostic device 8 determines whether the diagnostic time, corresponding to the time elapsed since the control mode of the oscillating target and the diagnostic targets was initially set to the sensing mode and the receiving mode, respectively, in Step ST3, has exceeded a predetermined set time. This set time is sufficiently longer than the cycle of the pulse voltage generated by the pulse power source of the oscillating target (i.e., the reciprocal of the oscillation frequency). However, as described above, the diagnostic targets being set to the receiving mode cannot detect proximity of an object to the electrode. Therefore, the set time is set within a range of a predetermined upper limit time. More specifically, the set time is set to, for example, approximately several hundred milliseconds. The fault diagnostic device 8 returns to Step ST3 if the determination result in Step ST5 is NO, or proceeds to Step ST6 if the determination result is YES. Thus, after setting the new oscillating target and diagnostic targets, the fault diagnostic device 8 measures the voltage of the reference capacitors through the measuring circuits of the diagnostic targets while the power circuit of the oscillating target is generating electromagnetic waves at the oscillation frequency from the electrode for the set time.

In Step ST6, the fault diagnostic device 8 diagnoses the presence or absence of faults in each diagnostic target, based on the time-series data of the voltage measurement values of each diagnostic target as obtained by repeatedly executing the processes of Steps ST3 and ST4 for the set time, and returns to the process of Step ST2. In other words, after diagnosing the presence or absence of faults in each diagnostic target, the fault diagnostic device 8 returns to Step ST1 and restarts the fault diagnostic process for the next turn.

More specifically, the fault diagnostic device 8 calculates the frequency, the average level, and the number of occurrences of pulse-like fluctuations of the voltage for each diagnostic target, based on the time-series data of the voltage measurement values obtained in the processes of Steps ST3 and ST4. The fault diagnostic device 8 diagnoses the presence or absence of faults in each diagnostic target by following the procedures described below, based on the frequency, the average level, and the number of occurrences of pulse-like fluctuations calculated based on the voltage measurement values.

Firstly, the fault diagnostic device 8 compares the frequency calculated based on the voltage measurement values with the oscillation frequency of the pulse power source of the oscillating target, thereby determining whether each diagnostic target has successfully received the electromagnetic waves at the oscillation frequency generated from the oscillating target. Specifically, the fault diagnostic device 8 determines that the electromagnetic waves generated from the oscillating target have been successfully received, if the absolute value of the difference between the frequency calculated based on the voltage measurement values and the oscillation frequency of the oscillating target is less than a predetermined value, and determines that the electromagnetic waves generated from the oscillating target have not been successfully received, if the absolute value of the difference is equal to or greater than the predetermined value. In the case of determining that the electromagnetic waves generated from the oscillating target have not been successfully received, the fault diagnostic device 8 determines that the diagnostic target is out of order (specifically, a so-called open-circuit fault due to disconnection in circuits of the diagnostic targets, caused by conductive patterns detached or switching elements degraded or destructed).

Next, with the procedures above, in the case of determining that the electromagnetic waves at the oscillation frequency generated from the oscillating target have been successfully received, the fault diagnostic device 8 compares the average level of the voltage calculated based on the voltage measurement values with a predetermined reference level, thereby determining whether the electromagnetic waves at the oscillation frequency generated from the oscillating target have been received by each diagnostic target with an appropriate degree of sensitivity. More specifically, if the difference between the average level of the voltage calculated based on the voltage measurement values and the reference level is less than a predetermined level, the fault diagnostic device 8 determines that the electromagnetic waves generated from the oscillating target have been received with an appropriate degree of sensitivity, and the diagnostic target is normal (i.e., not out-of-order). If the difference between the average level of the voltage calculated based on the voltage measurement values and the reference level is equal to or greater than the predetermined level, the fault diagnostic device 8 determines that the electromagnetic waves generated from the oscillating target have not been received with an appropriate degree of sensitivity. In the case of determining that the electromagnetic waves generated from the oscillating target have not been received with an appropriate degree of sensitivity, the fault diagnostic device 8 determines that the diagnostic target is out-of-order (specifically, the diagnostic target has a short-circuit fault due to short circuit caused by foreign objects intruded or switching elements degraded or destructed).

Here, the average level of voltage, in the case in which the electromagnetic waves generated by the oscillating target have been received by the diagnostic target, varies depending on the distance between the oscillating target and diagnostic targets as well as the presence of absence of obstacles. Therefore, the reference level is determined for each combination of the oscillating target and diagnostic targets.

Next, with the procedures above, in the case of determining that the electromagnetic waves at the oscillation frequency generated from the oscillating target have been received with an appropriate degree of sensitivity, the fault diagnostic device 8 compares the number of occurrences of pulse-like fluctuations calculated based on the voltage measurement values with a predetermined threshold, thereby determining the presence or absence of chattering faults in the switching elements (particularly, in the first switch) included in the diagnostic targets, for each diagnostic target. A chattering fault refers to a phenomenon where a switching element unintentionally intermittently repeats the connected state and the disconnected state for a predetermined period of time when the switching element is switched on/off. More specifically, in the case of determining that the number of occurrences of pulse-like fluctuations calculated based on the voltage measurement values is less than the threshold, the fault diagnostic device 8 determines that there is no chattering fault in the diagnostic target. In the case of determining that the number of occurrences of pulse-like fluctuations calculated based on the voltage measurement values is equal to or greater than the threshold, the fault diagnostic device 8 determines that there is a chattering fault in the diagnostic target.

The fault diagnostic device 8 sends information on the result of diagnosing each diagnostic target as acquired through the above procedures to the grip determination device 9.

Figure 5:
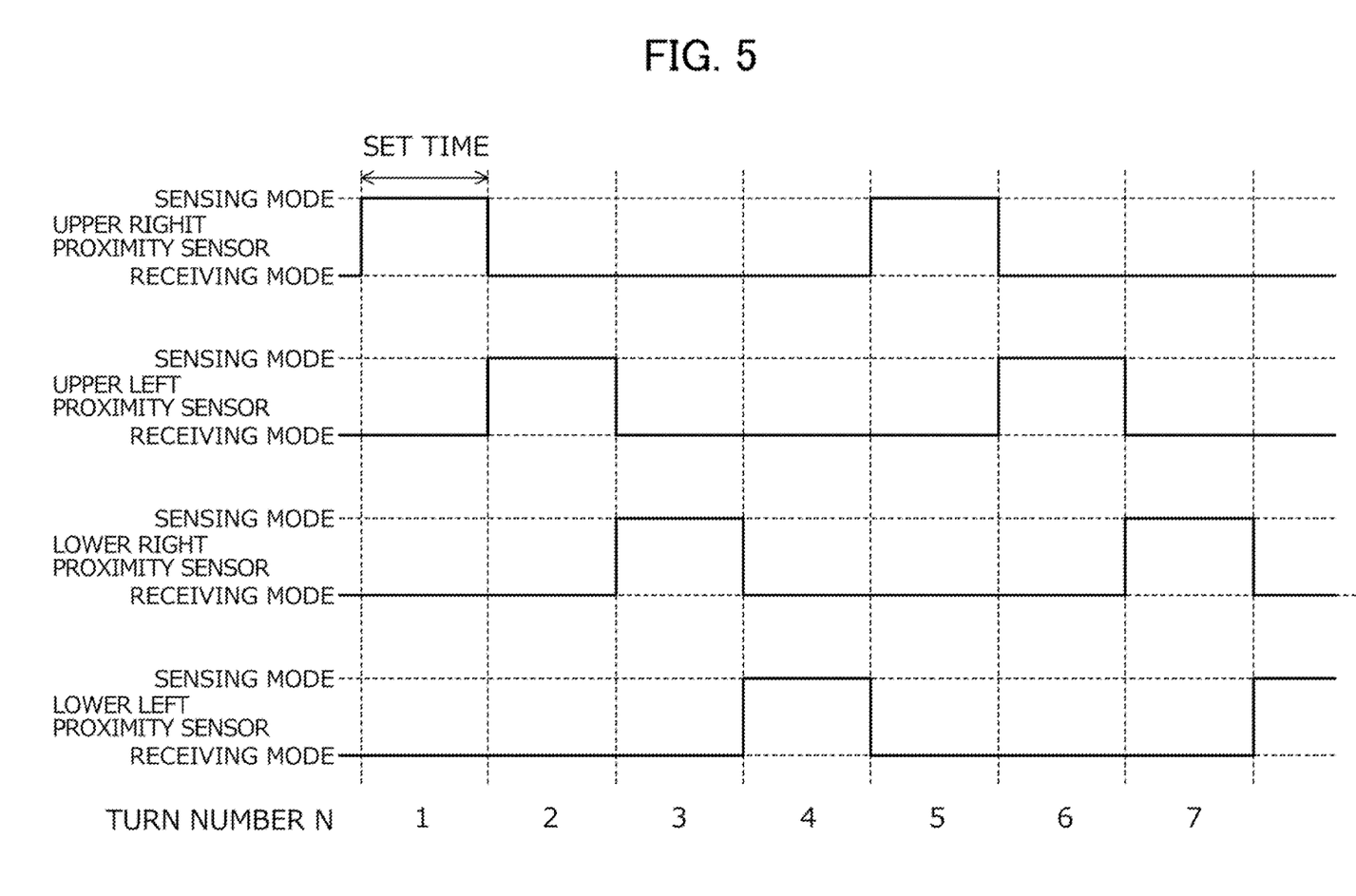
FIG. 5 is a time chart illustrating the transitions in control modes of each proximity sensor.

FIG. 5 is a time chart illustrating the transition of the control mode of the proximity sensors 4 to 7 in the case of setting the oscillating target and the diagnostic targets, based on the target setting table as illustrated in FIG. 4.

In the fault diagnostic process illustrated in FIG. 3, the fault diagnostic device 8 periodically switches the settings of the oscillating target and the diagnostic targets at each preset time. Therefore, as illustrated in FIG. 5, the control mode of the proximity sensors 4 to 7 also periodically switches between the sensing mode and the receiving mode at each preset time. As described above, while the control mode of the proximity sensor is set to the receiving mode, the proximity sensor cannot detect proximity of the human body to the steering wheel 2. However, by setting the oscillating target and the diagnostic targets, based on the target setting table as illustrated in FIG. 4, the control mode of each proximity sensor can be periodically set to the sensing mode every four turns, as illustrated in FIG. 5. This allows for diagnosing faults in each of the proximity sensors while the proximity sensors 4 to 7 sequentially monitors whether the steering wheel 2 is properly gripped by the driver.

The proximity sensor system S and the steering device 1 according to the present embodiment achieve the following effects:

(1) The proximity sensor system S includes: the plurality of proximity sensors 4 to 7 that detect proximity of the human body H to the steering wheel 2; and the fault diagnostic device 8 that diagnoses the presence or absence of faults in the proximity sensors 4 to 7. Each of the proximity sensors 4 to 7 includes: an electrode located at each different position on the steering wheel 2; the power circuit 45 that applies voltage at an oscillation frequency to the electrode; and the measuring circuit that measures the electrical characteristics of the electrode. The fault diagnostic device 8 sets at least two of the plurality of proximity sensors 4 to 7 as the oscillating target and the diagnostic target. While the power circuit of the oscillating target is generating electromagnetic waves at the oscillation frequency from the electrode, the fault diagnostic device 8 acquires the result of measuring the electrical characteristics from the measuring circuits of the diagnostic targets, and diagnoses the presence of absence of faults in the diagnostic targets, based on the result of measurement. When the power circuit of the oscillating target applies voltage of the oscillation frequency to the electrode, electromagnetic waves at the oscillation frequency are generated around the electrode. If there is no fault in the diagnostic target, the electrical characteristics of the electrode of the diagnostic targets change due to the antenna induction effect between the oscillating target and the diagnostic targets. Therefore, the presence or absence of faults in the diagnostic targets correlates with the measurement result acquired from the measuring circuits of the diagnostic targets. Thus, according to the present embodiment, the presence or absence of faults can be diagnosed using at least two of the plurality of proximity sensors 4 to 7 provided on the same steering wheel 2, allowing for a relatively simple configuration to diagnose faults in each of the proximity sensors 4 to 7, contributing to the development of a sustainable transportation system.

(2) While the oscillating target is generating electromagnetic waves, the fault diagnostic device 8 breaks connection between the electrode and the power circuit of the diagnostic target, while maintaining the connection between the electrode and the measuring circuit of the diagnostic target. Therefore, the present embodiment can prevent fluctuation of the electrical characteristics of the electrode of the diagnostic target due to the influence of the voltage applied from the power circuit of the diagnostic target, thus the presence or absence of faults in the diagnostic target can be diagnosed more accurately.

(3) The fault diagnostic device 8 periodically switches the settings of the oscillating target and diagnostic targets at predetermined intervals. Therefore, according to the present embodiment, even when a multitude of proximity sensors 4 to 7 are provided on the steering wheel 2, the presence or absence of faults in all of the proximity sensors 4 to 7 can be periodically diagnosed.

(4) As described above, when the power circuit of the oscillating target applies voltage at an oscillation frequency to the electrode, electromagnetic waves at the oscillation frequency are generated around the electrode. In this case, if there is no fault in the diagnostic target, the voltage of the reference capacitor connected to the electrode of the diagnostic target will fluctuate at the same frequency as the oscillation frequency of the oscillating target, due to the antenna induction effect between the oscillating target and the diagnostic target. Therefore, the fault diagnostic device 8 diagnoses the presence or absence of faults in the diagnostic target, based on comparison of the frequency of the voltage of the reference capacitor measured with the measuring circuit of the diagnostic target with the oscillation frequency of the power circuit of the oscillating target. This allows for highly accurately diagnosing the presence or absence of faults in the diagnostic target.

(5) Due to the antenna induction effect between the oscillating target and the diagnostic target, the level of the voltage of the reference capacitor connected to the electrode of the diagnostic target varies, based on the positional relationship between the electrode of the oscillating target and the electrode of the diagnostic target. Therefore, the fault diagnostic device 8 diagnoses the presence or absence of faults in the diagnostic target by comparing the level of the voltage measured with the measuring circuit of the diagnostic target with a predetermined reference level, allowing for more accurately diagnosing the presence or absence of faults in the diagnostic target According to the present embodiment, by comparing frequencies, not only can the presence or absence of faults be determined, but also the nature of the fault (such as an open-circuit fault) can be identified.

(6) In the present embodiment, by setting different oscillation frequencies for each proximity sensor, the frequency of electromagnetic waves generated by the electrode of the oscillating target can be varied for each proximity sensor. Therefore, the present embodiment allows for even more accurate diagnosis of the presence or absence of faults in the diagnostic targets. According to the present embodiment, by comparing levels, not only can the presence or absence of faults be determined, but also the nature of the fault (such as a short-circuit fault) can be identified.

(7) The fault diagnostic device 8 diagnoses the presence or absence of faults in the diagnostic target, based on the number of occurrences of pulse-like fluctuations in the voltage measured with the measuring circuit of the diagnostic target. This allows for diagnosing the presence or absence of chattering faults in the diagnostic target.

(8) The steering device 1 includes the steering wheel 2, the proximity sensor system S provided on the steering wheel 2, and the grip determination device 9 that determines whether the steering wheel 2 is gripped, based on the result of detection by the plurality of proximity sensors 4 to 7. Therefore, according to the present embodiment, while the driver is operating a vehicle equipped with the steering device 1, and the grip determination device 9 determines whether the driver is gripping the steering wheel 2, the fault diagnostic device 8 can diagnose the presence or absence of faults in the plurality of proximity sensors 4 to 7. This allows for diagnosing the presence or absence of faults in the proximity sensors 4 to 7 provided on the steering wheel 2 with a relatively simple configuration, contributing to the development of a sustainable transportation system.

Second Embodiment

Next, the proximity sensor system, the steering device, and the fault diagnostic method according to the second embodiment of the present invention will be described with reference to the drawings. The mechanical configuration of the proximity sensor system and the steering device in the present embodiment is almost the same as the mechanical configuration of the proximity sensor system S and the steering device 1 in the first embodiment, so the same reference numerals are used, and the illustration and detailed description are omitted.

Figure 6:
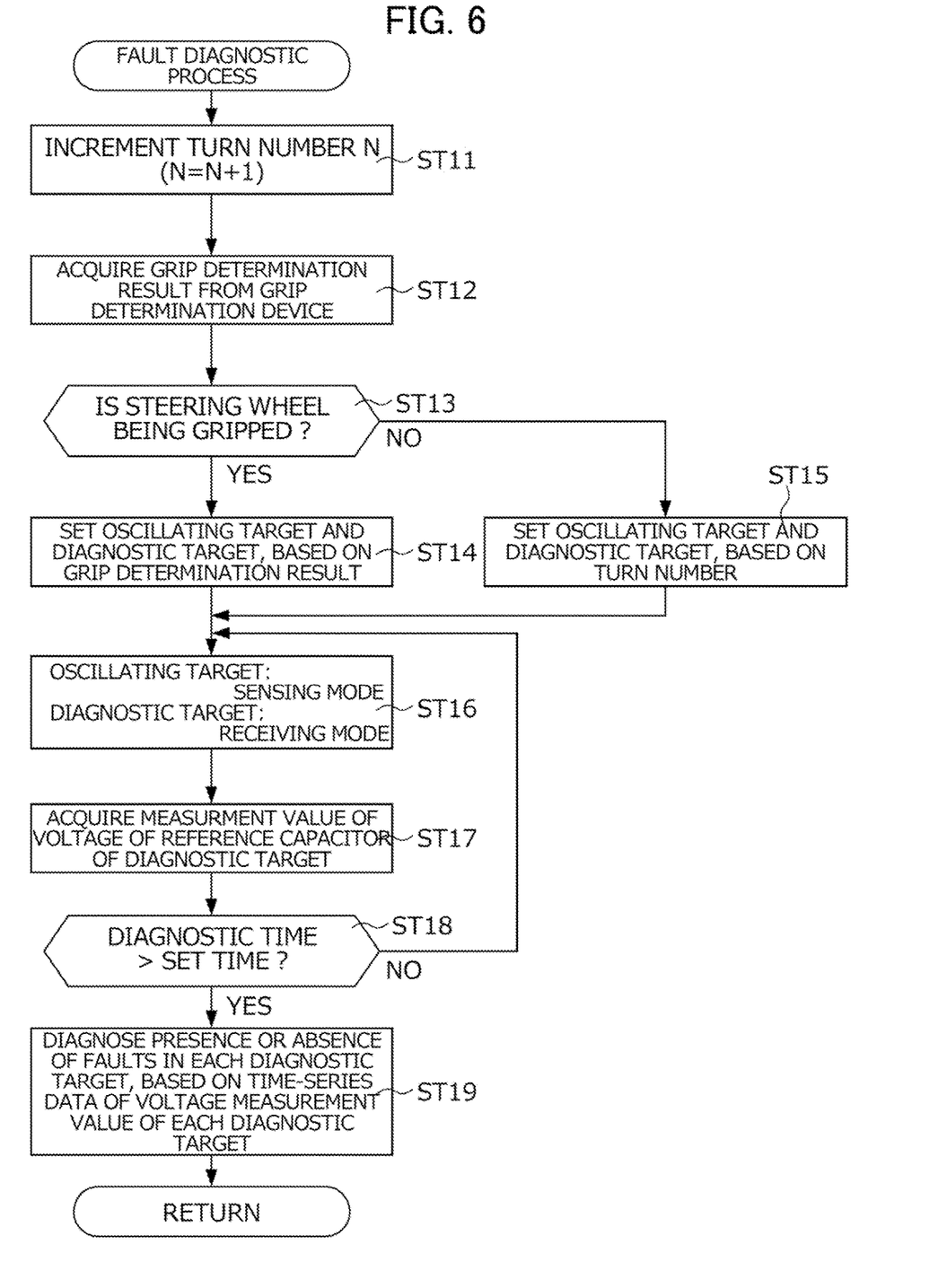
FIG. 6 is a flowchart illustrating the specific procedure of the fault diagnostic process in the proximity sensor system and the steering device according to the second embodiment of the present invention.

FIG. 6 is a flowchart illustrating the specific procedure of the fault diagnostic process by the fault diagnostic device according to the present embodiment. In the flowchart illustrated in FIG. 6, the processes in Steps ST11 and ST16 to ST19 are the same as those in Steps ST1 and ST3 to ST6 in the flowchart of FIG. 3, so the detailed description is omitted.

In Step ST12, the fault diagnostic device acquires the grip determination result (i.e., whether the driver is gripping the steering wheel, and the gripped position) from the grip determination device, and proceeds to Step ST13.

In Step ST13, the fault diagnostic device refers to the determination result acquired in Step ST12 and determines whether the driver is gripping the steering wheel. The fault diagnostic device proceeds to Step ST14 if the determination result in Step ST13 is YES, or proceeds to Step ST15 if the determination result is NO.

In Step ST15, the fault diagnostic device sets at least two of the plurality of proximity sensors 4 to 7 as a new oscillating target and a new diagnostic target, based on the grip determination result acquired in Step ST12, and proceeds to Step ST16.

More specifically, the fault diagnostic device refers to the grip determination result, thereby identifying a proximity sensor that detects proximity of a human body, i.e., the proximity sensor whose detection target region includes the gripped position. The fault diagnostic device sets an oscillating target from among the proximity sensors 4 to 7 that detect proximity of a human body, and sets a diagnostic target from among the proximity sensors 4 to 7 that do not detect proximity of a human body. The present embodiment is described for the case in which, from among the plurality of proximity sensors 4 to 7, the fault diagnostic device sets all of the proximity sensors that detect proximity of a human body as the oscillating targets, and all of the proximity sensors that do not detect proximity of a human body as the diagnostic targets, but the present invention is not limited to this. For example, only one selected from those detecting proximity of a human body may be set as the oscillating target, and only one selected from those not detecting proximity of a human body may be set as the diagnostic target.

In Step ST15, the fault diagnostic device sets at least two of the plurality of proximity sensors 4 to 7 as a new oscillating target and a new diagnostic target by following the same procedure as Step ST2 (refer to FIG. 3), and proceeds to Step ST16. That is, for example, the fault diagnostic device sets the oscillating target and the diagnostic target by searching the target setting table as illustrated in FIG. 4, based on the turn number N.

In addition to the effects (1) to (8) described above, the proximity sensor system and the steering device according to the present embodiment achieve the following effects.

(9) With the proximity sensors 4 to 7, in order to detect whether the human body H is in proximity to the steering wheel 2, the power circuit needs to apply voltage to the electrode as appropriate. In contrast, in order to accurately diagnose the presence or absence of faults, it is preferable for the proximity sensors set as the diagnostic targets to keep the disconnection of the electrode and the power circuit. In other words, while the proximity sensors are set as the diagnostic targets, the proximity sensors cannot detect the presence or absence of proximity of the human body H. Therefore, the fault diagnostic device according to the present embodiment sets the oscillating target from among the proximity sensors 4 to 7 that detect proximity of the human body H, and sets the diagnostic targets from among the proximity sensors 4 to 7 that do not detect proximity of the human body H. Thus, the presence or absence of faults in the proximity sensors set as the diagnostic targets can be diagnosed simultaneously while the proximity sensors set as the oscillating target keeps detecting the presence or absence of proximity of the human body H.

One embodiment of the present invention has been described above, but the present invention is not limited to this. The detailed configuration may be appropriately modified within the scope of the spirit of the present invention.

For example, the first embodiment has been described for the case in which at least two of the four proximity sensors 4 to 7 provided on the steering wheel 4 are set as the oscillating target and the diagnostic target, but the present invention is not limited to this. In the example illustrated in FIG. 1, the upper right electrode 40 and the lower right electrode 60 are positioned slightly away from the upper left electrode 50 and the lower left electrode 70. Therefore, if the upper right proximity sensor 4 is set as the oscillating target, and the lower left proximity sensor 7 is set as the diagnostic target, the electromagnetic waves generated from the upper right electrode 40 of the upper right proximity sensor 4 cannot be received at a sufficient level by the lower left electrode 70 of the lower left proximity sensor 7, and thus the presence or absence of faults in the diagnostic target may not appropriately be diagnosed.

Therefore, the fault diagnostic device may divide the four proximity sensors 4 to 7 into two groups: one group consisting of the upper right proximity sensor 4 and the lower right proximity sensor 6, and another group consisting of the upper left proximity sensor 5 and the lower left proximity sensor 7, in which one oscillating target and one diagnostic target may be set in each group, and each group may independently perform a fault diagnostic process.

For example, the embodiments have been described above for the case in which the spokes 25L and 25R include the electrodes 40 to 70 of the proximity sensors 4 to 7, but the present invention is not limited to this. The rim 20 or the hub 23 may include some or all of the electrodes. The embodiments have been described above for the case in which the number of proximity sensors provided in the steering wheel is four, but the present invention is not limited to this. The number of proximity sensors provided in the steering wheel may be any number, as long as the number is two or more.

What is claimed is:

1. A proximity sensor system, comprising:
a plurality of proximity sensors that detect proximity of a target object to a target structure; and
a fault diagnoser that diagnoses presence or absence of faults in the proximity sensors, wherein
each of the plurality of proximity sensors includes: an electrode provided at each different position of the target structure; a power circuit that applies voltage at an oscillation frequency to the electrode; and a measuring circuit that measures electrical characteristics of the electrode, and the fault diagnoser sets at least two of the proximity sensors as an oscillating target and a diagnostic target, acquires a result of measurement of the electrical characteristics with the measuring circuit of the diagnostic target while the power circuit of the oscillating target is generating electromagnetic waves at the oscillation frequency, and diagnoses the presence or absence of faults in the diagnostic target, based on the result of measurement.

2. The proximity sensor system according to claim 1, wherein
while the oscillating target is generating electromagnetic waves, the fault diagnoser breaks connection between the electrode and the power circuit of the diagnostic target and maintains connection between the electrode and the measuring circuit of the diagnostic target.

3. The proximity sensor system according to claim 2, wherein
the fault diagnoser sets the oscillating target from among the proximity sensors that detect proximity of the target object, and sets the diagnostic target from among the proximity sensors that do not detect proximity of the target object.

4. The proximity sensor system according to claim 2, wherein
the fault diagnoser periodically switches settings of the oscillating target and the diagnostic target at predetermined intervals.

5. The proximity sensor system according to claim 3, wherein
the measuring circuit measures voltage of a capacitor connected to the electrode via a switch, and
the fault diagnoser diagnoses the presence or absence of faults in the diagnostic target, based on comparison of a frequency of voltage measured with the measuring circuit of the diagnostic target with the oscillation frequency of the power circuit of the oscillating target.

6. The proximity sensor system according to claim 5, wherein
the fault diagnoser diagnoses the presence or absence of faults in the diagnostic target, based on comparison of a level of voltage measured by the diagnostic target with a predetermined reference level.

7. The proximity sensor system according to claim 6, wherein
the fault diagnoser diagnoses the presence or absence of faults in the diagnostic target, based on a number of occurrences of pulse-shaped fluctuations in the voltage measured by the diagnostic target.

8. The proximity sensor system according to claim 4, wherein
the measuring circuit measures voltage of a capacitor connected to the electrode via a switch, and
the fault diagnoser diagnoses the presence or absence of faults in the diagnostic target, based on comparison of a frequency of voltage measured with the measuring circuit of the diagnostic target with the oscillation frequency of the power circuit of the oscillating target.

9. The proximity sensor system according to claim 8, wherein
the fault diagnoser diagnoses the presence or absence of faults in the diagnostic target, based on comparison of a level of voltage measured by the diagnostic target with a predetermined reference level.

10. The proximity sensor system according to claim 9, wherein the fault diagnoser diagnoses the presence or absence of faults in the diagnostic target, based on a number of occurrences of pulse-shaped fluctuations in the voltage measured by the diagnostic target.

11. The proximity sensor system according to claim 3, wherein
the oscillation frequency differs for each proximity sensor.

12. The proximity sensor system according to claim 4, wherein
the oscillation frequency differs for each proximity sensor.

13. A steering device, comprising:
a steering wheel that receives a steering operation from a driver;
the proximity sensor system according to claim 1, provided on the steering wheel as the target structure; and
a grip determiner that determines whether the steering wheel is gripped, based on a result of detection by the proximity sensors.

14. A steering device, comprising:
a steering wheel that receives a steering operation from a driver;
the proximity sensor system according to claim 2, provided on the steering wheel as the target structure; and
a grip determiner that determines whether the steering wheel is gripped, based on a result of detection by the proximity sensors.

15. A steering device, comprising:
a steering wheel that receives a steering operation from a driver;
the proximity sensor system according to claim 3, provided on the steering wheel as the target structure; and
a grip determiner that determines whether the steering wheel is gripped, based on a result of detection by the proximity sensors.

16. A steering device, comprising:
a steering wheel that receives a steering operation from a driver;
the proximity sensor system according to claim 4, provided on the steering wheel as the target structure; and
a grip determiner that determines whether the steering wheel is gripped, based on a result of detection by the proximity sensors.

17. A fault diagnostic method of diagnosing presence or absence of faults in a plurality of proximity sensors that detect proximity of a target object to a target structure,
each of the plurality of proximity sensors including an electrode provided at each different position of the target structure, a power circuit that applies voltage at an oscillation frequency to the electrode, and a measuring circuit that measures electrical characteristics of the electrode,
the method comprising:
a first step of setting at least two of the proximity sensors as an oscillating target and a diagnostic target;
a second step of measuring electrical characteristics of the electrode with the measuring circuit of the diagnostic target, while the power circuit of the oscillating target is generating electromagnetic waves at the oscillation frequency; and
a third step of diagnosing the presence or absence of faults in the diagnostic target, based on a result of measurement in the second step.

\* \* \* \* \*